Feb. 27, 1968            T. A. HADDAD            3,371,287
HIGH POWER LASER INCORPORATING SELF-HEALING MIRROR MEANS
Filed March 15, 1963
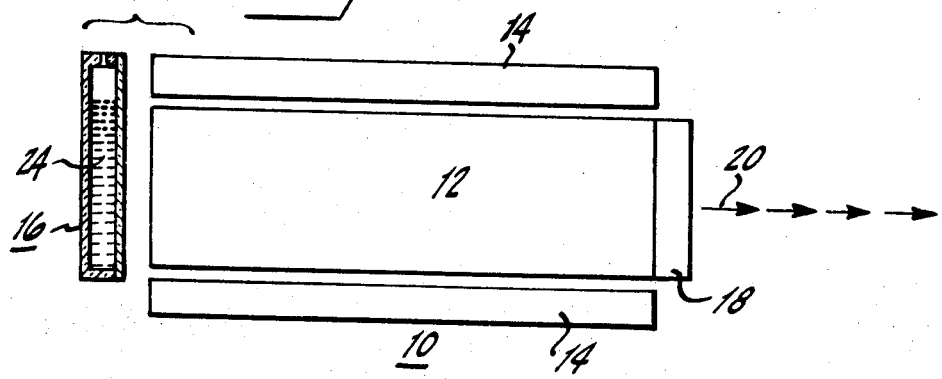
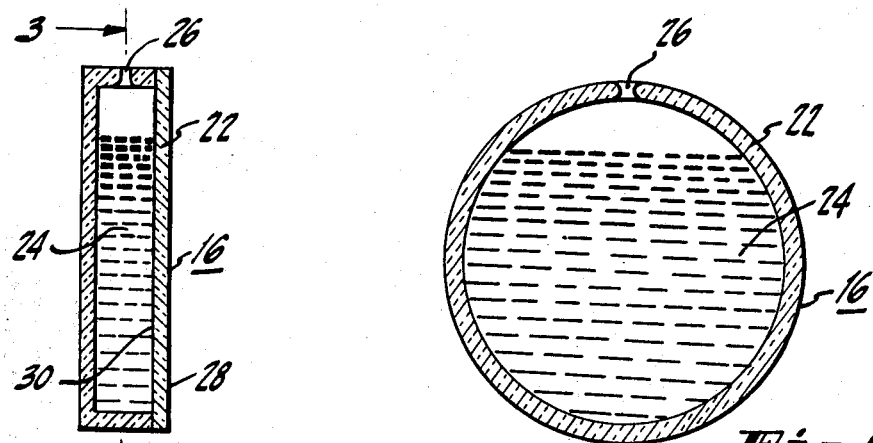
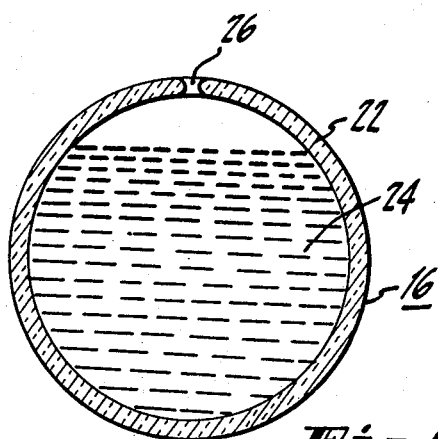
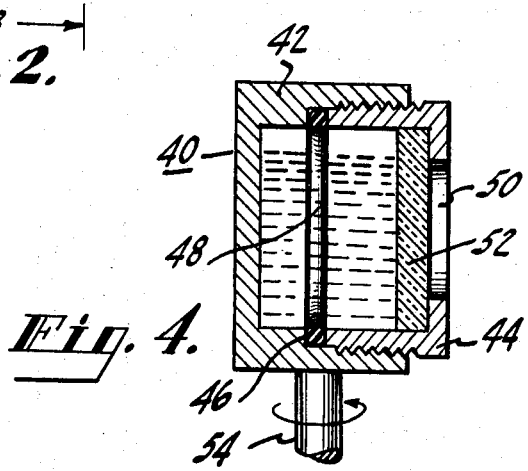
INVENTOR.
THEODORE A. HADDAD
BY
J. C. Whittaker
Attorney 
United States Patent Office 3,371,287
Patented Feb. 27, 1968

---

3,371,287
HIGH POWER LASER INCORPORATING SELF-HEALING MIRROR MEANS
Theodore A. Haddad, Lexington, Mass., assignor to Radio Corporation of America, a corporation of Delaware
Filed Mar. 15, 1963, Ser. No. 265,521
3 Claims. (Cl. 331—94.5)

This invention relates to an improved optical maser or laser. In particular, this invention relates to an improved laser cavity or optical reflector.

The term laser is a name used to refer to a device which provides "light amplification by stimulated emission of radiation." The laser device is most commonly used as a source of coherent light.

In general, a laser includes an active material that will produce the stimulated emission of radiation, an excitation source that pumps power into the active material, and a resonant structure or resonant optical cavity for oscillating the stimulated radiation.

The active lasing material is a material having two energy levels separated in energy by an amount corresponding to a characteristic frequency. The active material is characterized by the properties that (1) the atomic particles may be excited into a higher energy level, and thus an inverted population condition may be produced, and (2) when the atomic particles return to the lower energy level, the active lasing material emits light. The emitted light is such that, within the active lasing material, an incident photon triggers an ion to emit a photon in phase with the incident photon. Thus, substantially all of the emitted light is substantially in phase and is described as coherent light.

The excitation or pumping source is used to excite the ions into the higher energy level. Known pumping sources are radio frequency fields, xenon flash tubes and other known types of energy sources.

The resonant structure, or resonant optical cavity, includes two light reflecting surfaces, such as mirrors, positioned at opposite ends of the active lasing material. One of the light reflective surfaces normally has at least a portion which is partially transparent to the wavelength produced by the laser so that output coherent light may be obtained from the laser. The light reflective surfaces are precisely oriented so that at least one resonant mode will exist between the mirrors at a frequency for which the spacing between mirrors is an integral number of half wavelengths.

A more detailed description of laser structures, operation and theory is described by Vogel et al. in Electronics, Oct. 27, 1961, pages 40–47 and by Boyd et al. in Physical Review Letters 8, Apr. 1, 1962, pages 269–272.

When a laser is designed for high power applications, it has been found that the conventional light reflecting surfaces are destroyed by the high power of the laser beam as it oscillates in the resonant cavity. As is obvious, when one or both of the reflecting surfaces are destroyed, the stimulated emission cannot be resonated.

It is therefore an object of this invention to provide a novel laser cavity.

It is another object of this invention to provide a novel laser light reflecting device.

These and other objects are accomplished in accordance with this invention by providing a laser including an active laser body which produces coherent light. The active laser body, or material, is positioned in a novel laser cavity. The novel laser cavity includes at least one light reflecting device in which the light reflecting surface is "self healing" in that it is made of a light reflecting liquid, e.g. liquid mercury and/or gallium, etc. Should a part of the light reflecting liquid be destroyed by the high power of the laser beam, the light reflecting liquid flows to replace the damaged, or destroyed, light reflecting properties.

The invention will be described in greater detail by reference to the accompanying drawings wherein:

FIG. 1 is a partially schematic view of a laser device including a light reflecting device of this invention;

FIG. 2 is an enlarged sectional view of a modification of a light reflecting device of the type shown in FIG. 1;

FIG. 3 is a plan view of the light reflecting device taken along line 3—3 of FIG. 2; and FIG. 4 is an enlarged sectional view of another embodiment of this invention.

FIG. 1 shows a laser device 10 for producing coherent light radiation. The laser 10 generally comprises an active lasing material 12, a pumping source 14, and a pair of optical reflecting devices 16 and 18. The light reflecting devices 16 and 18 form the opposite ends of an optical resonant cavity.

The active material 12 may comprise any known substance which has at least two atomic states, or energy levels, separated by an amount corresponding to a characteristic transition emission frequency. The active material 12 has the property of being excitable into an inverted population density condition. In other words, the active material 12 is capable of having an excess population provided in the upper energy level as compared to a lower energy level. The active material 12 emits coherent light as the atomic particles return from the upper energy level to a lower energy level. The active material 12 may comprise a solid, or a gas. Examples of active lasing materials are calcium fluoride doped with trivalent dysprosium or gallium arsenide.

The active lasing material 12 is positioned in a resonant cavity formed by light reflecting devices 16 and 18. The light reflecting devices 16 and 18 are precisely oriented so that one or more resonant modes will exist between the light reflecting devices at frequencies for which the spacing therebetween is an integral number of half wavelengths. At least a portion of one of the light reflecting devices, e.g. light reflecting device 18, is partially transparent so that a coherent light output beam 20 may be obtained from the laser device 10. For example, the light reflecting device 18 may be a 75% reflective coating of aluminum or silver on the end of the laser material 12. The light reflecting device 16 will be described in greater detail in connection with FIGS. 2, 3 and 4.

The pumping source 14 may comprise any source of energy which is capable of exciting the atomic particles, in the active lasing material 12, from a lower energy level into a higher energy level. In other words, the pumping source 14 is a source of energy for establishing the inverted population density condition in the active lasing material 12. Examples of such pumping sources are a radio frequency field, a xenon flash tube or other known types of energy sources.

The light reflecting device 16 is completely reflecting while, as previously stated, the light reflecting device 18 has a portion at least which is partially transparent. As shown more clearly in FIGS. 2 and 3, the light reflecting device 16 may comprise a transparent container 22 which may be made of a material such as glass, clear quartz or transparent plastic. Positioned within the transparent container 22 is a liquid light reflecting material. It should be understood that the terms transparent and light reflecting refer to radiation of the wavelength produced by the laser material 12. Examples of such a light reflecting material that is in a liquid form at the operating temperature of the laser are mercury, gallium, mixtures of gallium and mercury, and mixtures of gallium and aluminum. A preferred light reflecting material is gallium, and mixtures thereof, because of its low melting point and high boiling point and its low toxicity. As a specific example, a mixture of 15% aluminum and 85% gallium will form a good liquid light reflector. The light reflecting liquid material 24 may be inserted into the container 22 by means of an aperture 26 in the container 22.

The dimensions of the container 22 are not critical except that the surface 28 which is positioned toward the active laser body 12 should be ground optically flat and polished so that the laser light will not be reflected from, or diffused by, irregularities in the surface 22. Also, the inner surface 20 toward the active material 12 should be flat and optically polished for the same reasons. The inner surface may be ground flat before the face plate portion having surfaces 28 and 30 is sealed to the balance of the container.

An example of a light reflecting device that has been used is a container 22 made of glass .040″ thick with a circular hollow space of approximately 1″ diameter and ¼″ thickness. The aperture 26 is preferably relatively small, e.g. ⅛″ to permit the insertion of the liquid reflecting medium. The amount of light reflecting liquid 24 that is used will depend upon the size of container 22 but in the above example approximately 15 grams was used.

It has been found that the liquid light reflecting material 24 which functions as a reflecting surface in the laser cavity is immediately restored, if disrupted, due to the fluidity of the liquid reflector. As an example, a high power laser beam was fired into a liquid mercury reflecting surface as described in the example, and the light reflecting liquid surface showed no evidence of deterioration after 10 flashes of the laser beam. Using the same laser, and an aluminized mirror on a chromium substrate, a single flash of the laser beam burned a ⅛″ diameter hole in the coating. As is obvious, such a hole destroyed the light reflecting properties of the mirror and therefore the resonant cavity.

The light reflecting device 1 may be precisely positioned at any desired distance, with the spacing between mirrors being an integral number of half wavelengths, from the active lasing material 12 as long as it is parallel to the end of the active lasing body 12. As an example, depending upon the wavelength produced and the desired operation, spacing in the range of abutting to spacing of about three feet have been used.

When desired, the polished end A of the active lasing body 12 may be sealed into the container 22, (not illustrated) so that the liquid light reflecting medium 24 is in actual contact with the active material.

FIG. 4 illustrates an embodiment of this invention particularly useful with "Q" spoiling techniques. Briefly this technique is to pump the active laser material in the absence of a resonant cavity, e.g. when the mirror is rotated away from its light reflecting position. Then, when sufficient pump energy has been applied, the mirror is rotated to its reflecting position to improve the "Q" of the cavity, which starts the oscillations and fires the laser.

The mirror 40 comprises a cylindrical metal housing 42. Attached to the housing 42 is an apertured retainer plate 44 which presses against an O-ring 46 to form a liquid-tight seal and to form a container for the liquid metallic reflector 48. The aperture 50 in the retainer plate 44 is closed by an optically flat glass disc 52. As was previously stated, the glass disc 52 should be optically flat on both sides to prevent light diffusion or reflection. The entire mirror 40 is mounted on a rotatable shaft 54. The size of the mirror 40 is governed by the size of the particular laser crystal material used. For example, ¼″ diameter aperture 50 may be used with a ¼″ diameter laser rod.

What is claimed is:

1. In a laser, means incorporating mirror means for producing a high power beam of coherent light which impinges on and is reflected from the mirror surface of said mirror means, said high power beam being capable of having an intensity sufficient to destroy on contact that portion of said mirror means on which it impinges, and wherein said mirror means comprises a container transparent to said beam and containing a liquid having mirror-like reflection characteristics, whereby said mirror means upon exposure to a high power beam which has said intensity is self-healing.

2. The laser defined in claim 1, wherein said liquid is composed of at least one of mercury, gallium and aluminum.

3. The laser defined in claim 2, wherein said liquid is composed of a mixture of 15% aluminum and 85% gallium.

References Cited
UNITED STATES PATENTS

| | | |
|---|---|---|
| 2,384,666 | 9/1945 | Wood. |
| 3,149,290 | 9/1964 | Bennett et al. _____ 331—94.5 |

OTHER REFERENCES

Mirror Intensifies Laser Output, Electronics, vol. 35, No. 34 (Aug. 24, 1963), p. 48.

Undersea Coherent Light, Electronics, vol. 36, No. 8 (Feb. 22, 1963), p. 30.

JEWELL H. PEDERSEN, *Primary Examiner.*

W. L. SIKES, *Assistant Examiner.*